United States Patent
Balzer et al.

(10) Patent No.: US 6,631,562 B1
(45) Date of Patent: Oct. 14, 2003

(54) METHOD FOR COATING RADIATOR SUPPORT ASSEMBLY

(75) Inventors: Jason Scott Balzer, Canton, MI (US); Michael Henry Maj, Livonia, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 09/688,101

(22) Filed: Oct. 13, 2000

Related U.S. Application Data

(60) Provisional application No. 60/159,180, filed on Oct. 13, 1999.

(51) Int. Cl.[7] .............................................. B21D 53/88
(52) U.S. Cl. ........................ 29/897.2; 29/458; 29/460; 29/527.2
(58) Field of Search ............................... 29/897.2, 897, 29/890.03, 890.051, 890.052, 458, 460, 428, 527.2, 527.1; 427/402, 405, 419.8, 435, 436; 248/232, 209

(56) References Cited

U.S. PATENT DOCUMENTS

| | | | |
|---|---|---|---|
| 4,196,774 A | * | 4/1980 | Hoffmann |
| 4,564,168 A | * | 1/1986 | Ikuta et al. |
| 4,651,839 A | * | 3/1987 | Isobe |
| 4,742,881 A | * | 5/1988 | Kawaguchi et al. |
| 4,908,231 A | * | 3/1990 | Nelson et al. |
| 5,209,541 A | | 5/1993 | Janotik |
| 5,211,995 A | * | 5/1993 | Kuehnle et al. |
| 5,213,386 A | | 5/1993 | Janotik et al. |
| 5,228,359 A | | 7/1993 | Thomas |
| 5,271,687 A | | 12/1993 | Holka et al. |
| 5,287,940 A | * | 2/1994 | Ogawa et al. |
| 5,320,403 A | | 6/1994 | Kazyak |
| 5,324,399 A | * | 6/1994 | Ludwig et al. |
| 5,332,281 A | | 7/1994 | Janotik et al. |
| 5,338,080 A | | 8/1994 | Janotik et al. |
| 5,343,666 A | | 9/1994 | Haddad et al. |
| 5,403,048 A | | 4/1995 | Ekladyous et al. |
| 6,260,609 B1 | * | 7/2001 | Takahashi |

* cited by examiner

*Primary Examiner*—Charles T. Jordan
*Assistant Examiner*—T. Nguyen
(74) *Attorney, Agent, or Firm*—Raymond L. Coppiellie

(57) ABSTRACT

A method is provided for coating a radiator support assembly for a motor vehicle including the steps of providing magnesium components for the radiator support assembly and coating the magnesium components. The method also includes the steps of assembling the magnesium components into the radiator support assembly and painting the radiator support assembly.

20 Claims, 4 Drawing Sheets

METHOD FOR COATING RADIATOR SUPPORT ASSEMBLY

CROSS-REFERENCE TO RELATED APPLICATION(S)

The present application claims priority from provisional application Ser. No. 60/159,180 filed Oct. 13, 1999.

BACKGROUND OF THE INVENTION

1. Field of the Invention

The present invention relates generally to radiator supports for motor vehicles and, more specifically, to a method for coating a radiator support assembly for a motor vehicle.

2. Description of the Related Art

It is known to provide a radiator support for a motor vehicle. Typically, the radiator support is made of stamped steel. The radiator support has separate components attached thereto. These components include a brace for a hood latch, a grille opening reinforcement (GOR), brackets for the GOR, and a cover for a radiator opening attached to the radiator support.

It is also known that vehicle components are typically coated with a phosphate material in a phosphate bath prior to painting at a vehicle assembly bath. The phosphate bath will be contaminated by magnesium materials used for the vehicle components when a large number of the vehicle components are processed at the vehicle assembly plant.

Although the above radiator support has worked well, it is desirable to provide a single first front structure for a motor vehicle that is die-cast, injection molded, or cast. It is also desirable to reduce weight, variable cost, and labor, while improving quality and vehicle durability, of a radiator support for a vehicle. It is further desirable to provide a radiator support that requires less package space in a vehicle. It is yet further desirable to coat a magnesium radiator support to prevent contamination of a phosphate bath and aid in galvanic protection. Therefore, there is a need in the art to provide a new radiator support assembly for a motor vehicle.

SUMMARY OF THE INVENTION

Accordingly, the present invention is a method for coating a radiator support assembly for a motor vehicle including the steps of providing magnesium components for the radiator support assembly and coating the magnesium components. The method also includes the steps of assembling the magnesium components into the radiator support assembly and painting the radiator support assembly.

One advantage of the present invention is that a multi-functional radiator support assembly is provided for a motor vehicle. Another advantage of the present invention is that the multi-functional radiator support assembly is a first front structure for the vehicle that is die-cast, injection molded, or cast. Yet another advantage of the present invention is that the multi-functional radiator support assembly combines the function of the radiator support, hood-latch support system, grille opening reinforcement, and several attachment/reinforcement brackets into a single die-cast, injection molded, or cast component. Still another advantage of the present invention is that the multi-functional radiator support assembly uses die-cast magnesium as the material for the structure. A further advantage of the present invention is that the multi-functional radiator support assembly provides improved dimensional control, reduction of tooled end items, fifty percent to seventy percent weight reduction, reduction of variable cost and labor, while improving lateral/torsional bending modes, and one hundred percent improvement in strength and durability of the vehicle. Yet a further advantage of the present invention is that the multi-functional radiator support assembly requires less packaging space, enabling reduction of front end overhang and supporting various styling needs, and saves a large amount of weight. Still a further advantage of the present invention is that a method is provided for coating the radiator support assembly to prevent the magnesium material from contaminating phosphate material and prevent corrosion when assembled to steel material components.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
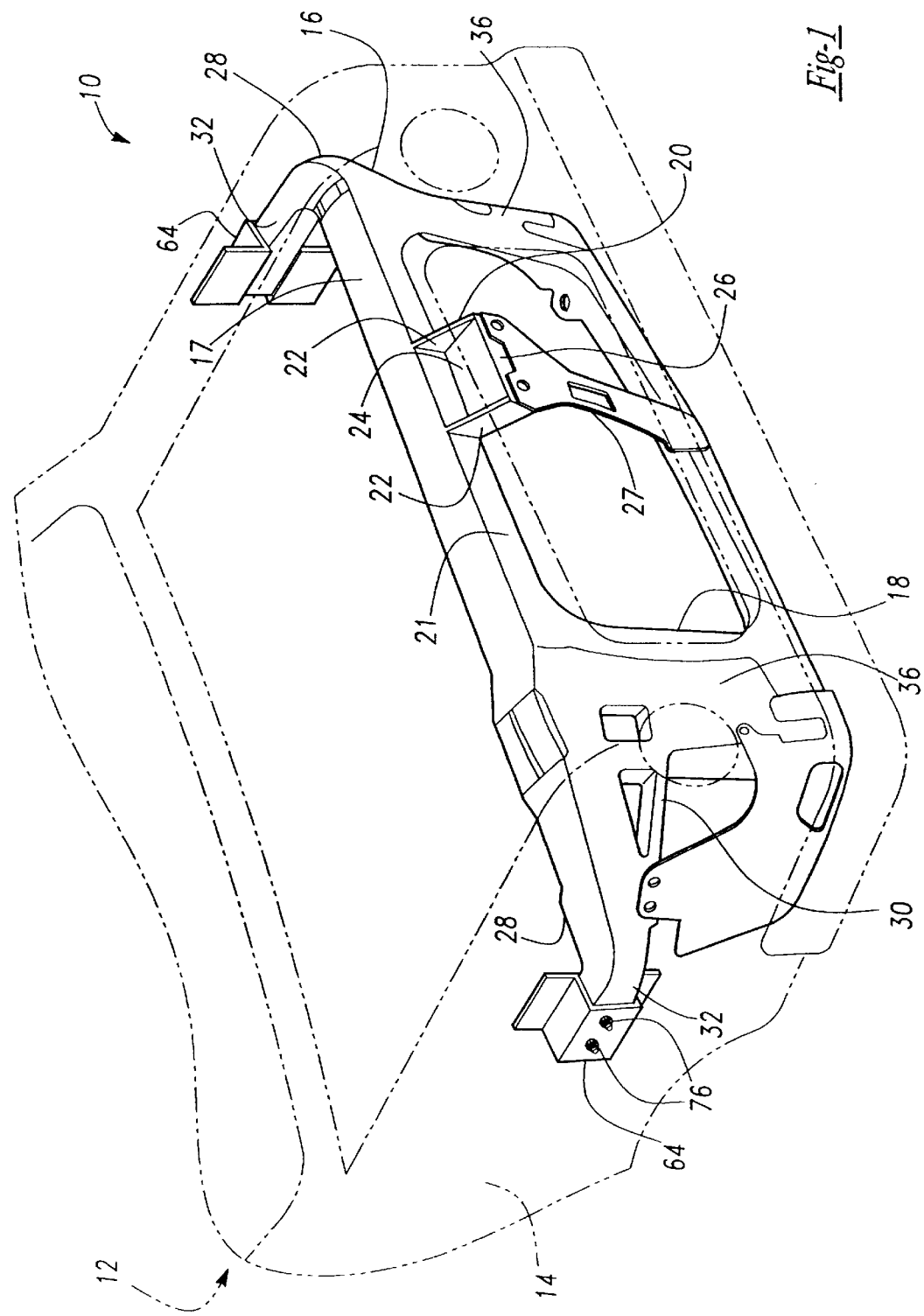
FIG. 1 is a front perspective view of a multi-functional radiator support assembly, according to the present invention, illustrated in operational relationship with a motor vehicle.

Referring to the drawings and in particular FIG. 1, one embodiment of a multi-functional radiator support assembly 10, according to the present invention, is illustrated in operational relationship with a motor vehicle 12. The radiator support assembly 10 is located at a forward or front end of a body 14 of the motor vehicle 12. The radiator support assembly 10 is used to support a radiator, condenser, and/or auxiliary coolers (not shown). It should be appreciated that, except for the multi-functional radiator support assembly 10, the motor vehicle 12 is conventional and known in the art.

Figure 2:
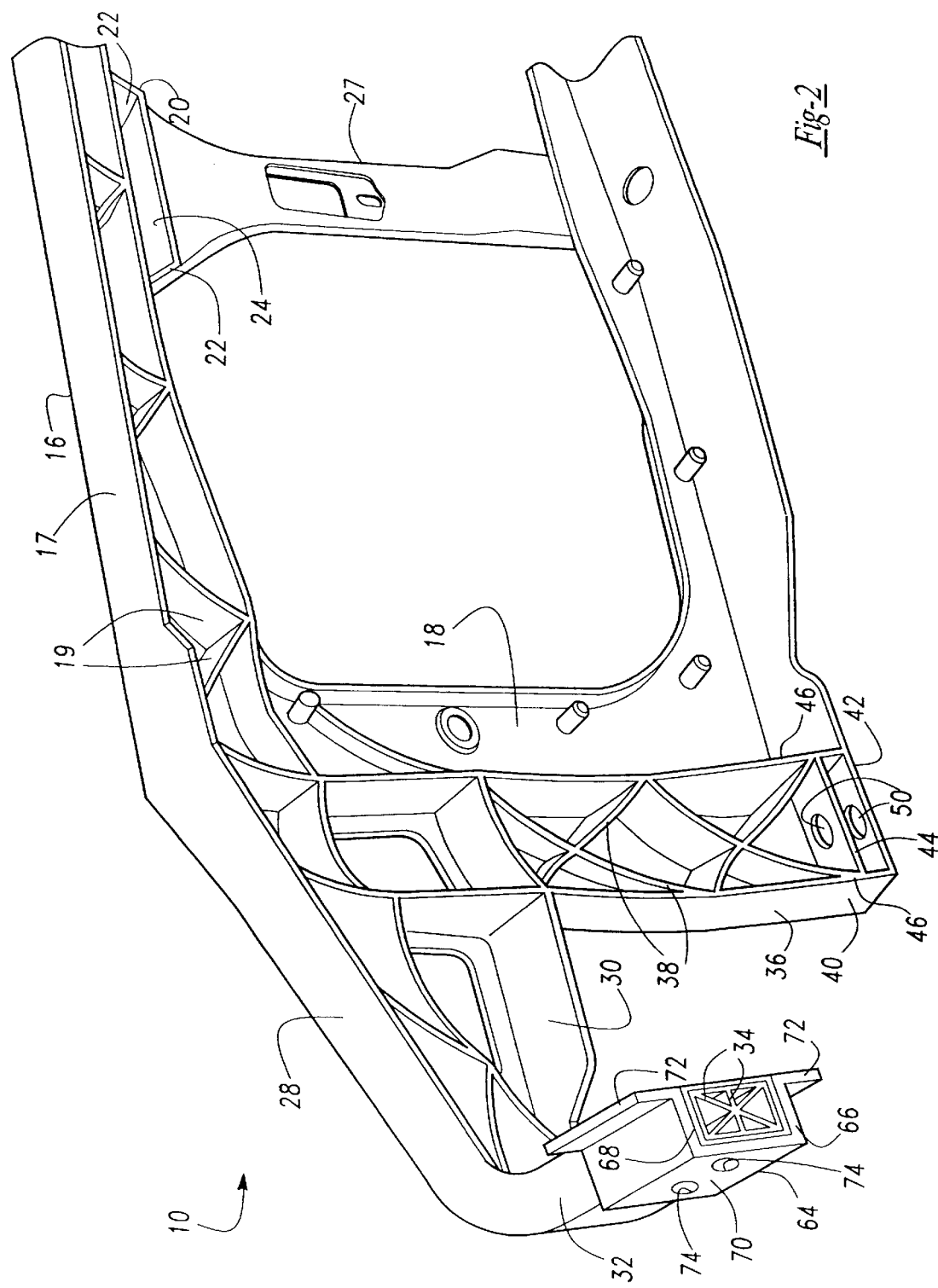
FIG. 2 is a rear perspective view of a portion of the multi-functional radiator support assembly of FIG. 1.
Figure 3:
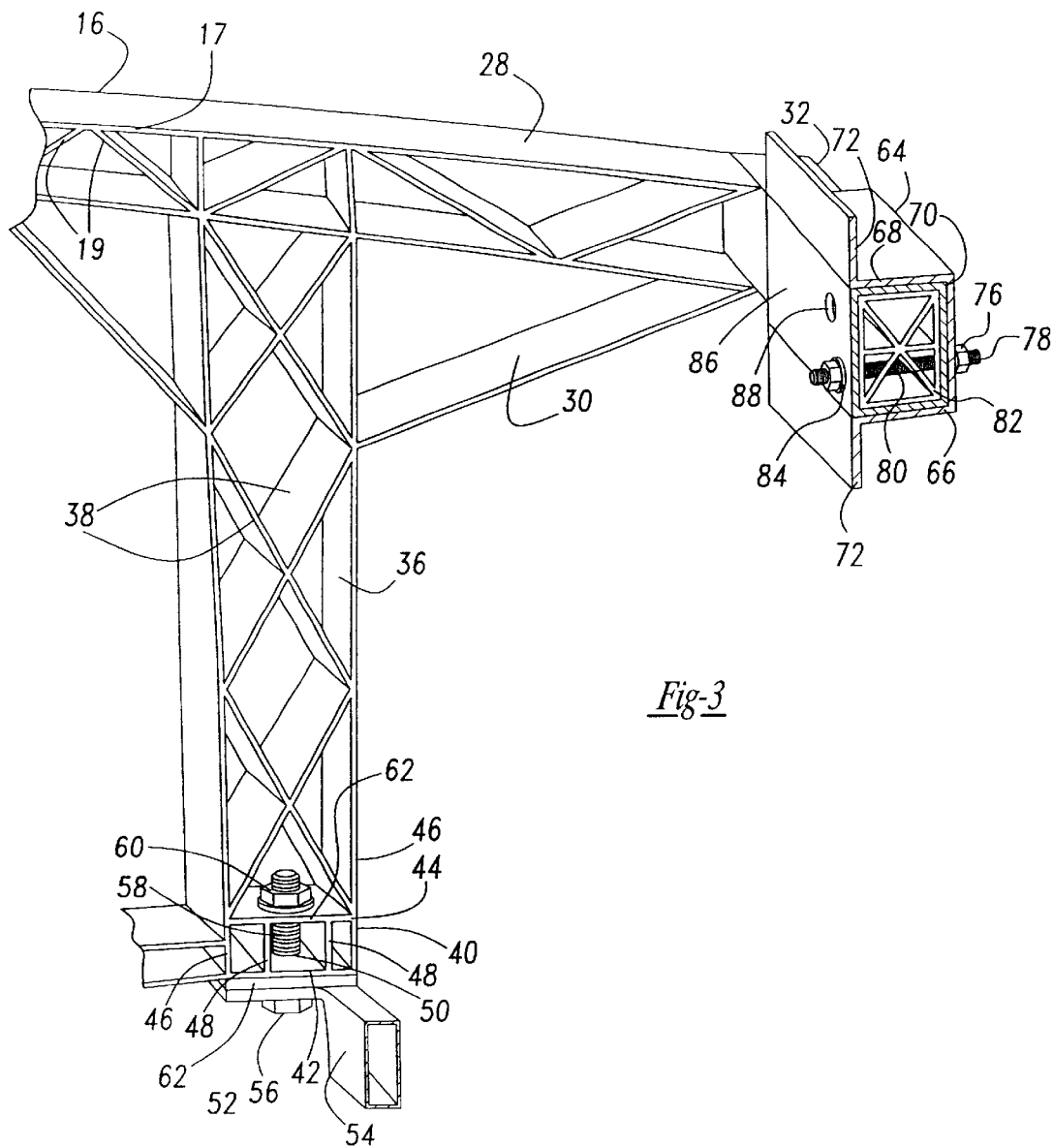
FIG. 3 is a rear perspective view of another portion of the multi-functional radiator support assembly of FIG. 1.

Referring to FIGS. 1 through 3, the multi-functional radiator support assembly 10 includes a radiator support 16 extending generally vertically and laterally. The radiator support 16 is generally rectangular in shape. The radiator support 16 has a front portion 17 and an opening 18 extending longitudinally through the front portion 17. The opening 18 is generally rectangular in shape. The front portion 17 may include at least one, preferably a plurality of rib portions 19 to provide stiffness and strength thereto.

The radiator support 16 also includes a hood-latch support portion 20 extending forwardly and longitudinally from a forward face 21 of the front portion 17 to support a hood-latch (not shown). The support portion 20 is generally rectangular in shape. The support portion 20 includes side walls 22 spaced laterally and extending longitudinally downwardly at an angle and a base wall 24 extending generally laterally and horizontally therebetween. The support portion 20 also includes a forward wall 26 at the forward end of the side walls 22 and base wall 24 for a function to be described. It should be appreciated that a support member 27 may extend between the support portion 20 and the front portion 17 across the opening 18 and either cast in to the radiator support 16 or be attached thereto by suitable means such as fasteners (not shown).

The radiator support 16 has a pair of arm portions 28 extending laterally outwardly from the front portion 17. The arm portions 28 are generally rectangular in shape and extend from an upper end on each side of the front portion 17. The radiator support 16 may include a brace portion 30 extending diagonally between each of the arm portions 28 and the front portion 17.

The radiator support 16 also has an attachment portion 32 extending longitudinally and rearwardly from each of the arm portions 28 for attachment to the body 14 of the motor vehicle 12. The attachment portions 32 are generally rectangular in shape. The attachment portion 32 may include at least one, preferably a plurality of rib portions 34 to provide stiffness and strength thereto.

The radiator support 16 has a pair of leg portions 36 extending generally vertically on both sides of the front portion 17. The leg portions 36 are generally rectangular in shape and are disposed on each side of the front portion 17. The leg portion 36 may include at least one, preferably a plurality of rib portions 38 to provide stiffness and strength thereto. The leg portion 36 may include a frame mount portion 40 at a lower end thereof. The frame mount portion 40 has a lower wall 42 and an upper wall 44 spaced vertically from the lower wall 42. The frame mount portion 40 also has outer walls 46 extending vertically between the lower and upper walls 42 and 44. The frame mount portion 40 may include a pair of inner walls 48 spaced laterally from the outer walls 46 and each other and extending vertically between the lower and upper walls 42 and 44. The frame mount portion 40 includes an aperture 50 extending through the lower and upper walls 42 and 44 and aligned with each other for a function to be described. It should be appreciated that the frame mount portion 40 may be of a double box section.

The radiator support 16 is made as a single structural magnesium die casting. The radiator support 16 is a monolithic structure being integral, unitary, and one-piece. The integrated radiator support 16 weighs approximately fourteen pounds.

Referring to FIG. 3, the multi-functional radiator support assembly 10 includes a fastener 52 to fasten each of the leg portions 36 to a support rail 54 of a frame (not shown) of the vehicle. The fastener 52 is of a bolt type having a head 56 and a threaded shaft 58 extending through an aperture (not shown) in the support rail 54 and through the apertures 50 in the frame mount portion 40. The fastener 52 includes a nut 60 to threadably engage the shaft 58 and abut the upper wall 44. The fastener 52 is made of a metal material such as steel. It should be appreciated that the fastener 52 is conventional and known in the art.

Referring to FIG. 3, the multi-functional radiator support assembly 10 includes spacers 62 between the fastener 52, the support rail 54, and the radiator support 16 to resist galvanic corrosion between the steel and magnesium. In one embodiment, the spacer 62 is a washer disposed between the nut 60 and upper wall 44. The spacer 62 is made of a metal material such as aluminum or a plastic material. In another embodiment, the spacer 62 may be a plate disposed between the support rail 54 and the lower wall 42.

Referring to FIGS. 1 through 3, the multi-functional radiator support assembly 10 includes bridging brackets 64 to fasten each of the attachment portions 32 of the arm portions 28 to the body 14 of the vehicle 12. The bridging brackets 64 have a lower wall 66, an upper wall 68 spaced vertically from the lower wall 66, and a side wall 70 extending between the lower wall 66 and upper wall 68 to form a generally "U" shaped cross section. The bridging brackets 64 also have a flange 72 extending generally perpendicularly and vertically form the upper wall 68 and lower wall 66. The bridging brackets 64 have at least one, preferably a pair of apertures 74 extending through the side wall 70 for a function to be described. The bridging brackets 64 are made of a metal material such as steel. It should be appreciated that the flanges 72 are fastened or attached to an inner fender (not shown) of the body 14 of the vehicle 12 by suitable means such as welding.

The multi-functional radiator support assembly 10 includes a fastener 76 to fasten each of the bridging brackets 64 to the attachment portions 32 of the radiator support 16. The fastener 76 is of a bolt type having a head 78 and a threaded shaft 80 extending through the aperture 74 in the side wall 70 and an aperture 82 in the attachment portion 32. The fastener 76 includes a nut 84 to threadably engage the shaft 80 and abut a wall of the attachment portion 32. The fastener 76 is made of a metal material such as steel. It should be appreciated that the fastener 76 is conventional and known in the art.

The multi-functional radiator support assembly 10 includes spacers 86 between the fastener 76, the bridging bracket 64, and the radiator support 16 to resist galvanic corrosion between the steel and magnesium. In one embodiment, the spacer 86 is a hollow rectangular sleeve disposed about the attachment portion 32 and between the upper wall 68, lower wall 66, and side wall 70 of the bridging bracket 64. The spacer 86 has at least one, preferably a plurality of apertures 88 extending therethrough and aligned with the apertures 74 and 82 in the bridging bracket 64 and attachment portion 32, respectively. The spacer 86 is made of a metal material such as aluminum. Alternatively, the spacer 86 could be made of a thermoset plastic, which can be melted, but not limited to melting, when the radiator support assembly 10 is painted and adheres to the bridging brackets 64 and attachment portions 32 to resist galvanic corrosion. It should be appreciated that the nut 84 abuts the spacer 86.

Figure 4:
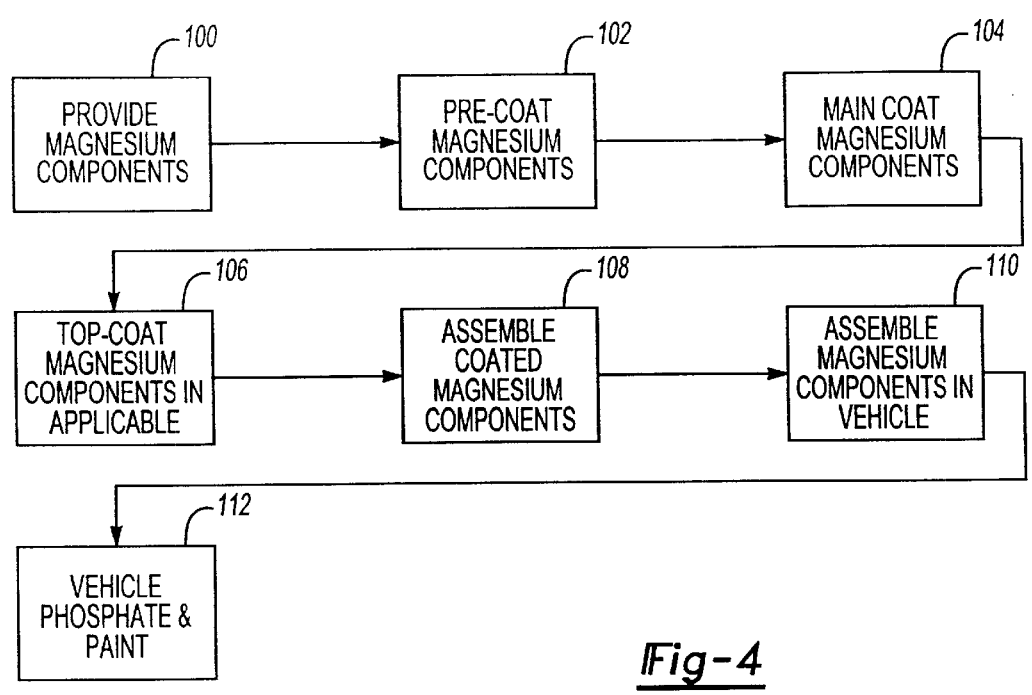
FIG. 4 is a flowchart of a method, according to the present invention, of coating magnesium components of the multi-functional radiator support assembly of FIG. 1.

Referring to FIG. 4, a method, according to the present invention, is disclosed for coating magnesium components for the multi-functional radiator support assembly 10. The method includes starts in block 100 and includes the step of providing magnesium components of the radiator support assembly 10. The magnesium components include at least the radiator support 16. The method advances to block 102 and includes the step of pre-coating the magnesium components. In one embodiment, the radiator support 16 is pre-coated with a phosphate material by a conventional dipping process. In another embodiment, the radiator support 16 is pre-coated with Alodine 5200 material or an anodized magnesium (AnoMag) material.

The method advances to block 104 and includes the step of coating the magnesium components with a main coat. In one embodiment, the radiator support 16 is coated with a powder coat or a sealer, if applicable, to the pre-coated magnesium components. In one embodiment, the radiator support 16 receives a pre-coat of either one of Alodine 5200 or AnoMag material and a sealer such as an organic sealer over the pre-coat. In another embodiment, the radiator support 16 receives a pre-coat of Alodine 5200 and a powder coat such as a plastic paint over the pre-coat.

After block 104, the method advances to block 106 and includes the step of top-coating the magnesium components, if applicable. In one embodiment, the radiator support 16 is top-coated with an E-coat over the sealer if the pre-coat was Alodine 5200 by a conventional dipping process. The method advances to block 108 and includes the step of assembling the coated magnesium components along with other components to form the assembled radiator support assembly 10. As described above, the radiator support 16 is assembled with bridging brackets, spacers, fasteners, etc., to form the radiator support assembly 10. After block 108, the method advances to block 110 and includes the step of assembling the assembled magnesium components into the motor vehicle 12. In one embodiment, the radiator support 16 is assembled into the motor vehicle 12 as previously described. The method advances to block 112 and includes the step of coating the motor vehicle 12 with a phosphate material and painting the radiator support assembly 10 and the motor vehicle 12 at a motor vehicle assembly plant (not shown). In one embodiment, the radiator support assembly 10 is phosphated and painted using a conventional dipping process.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for coating a radiator support assembly for a motor vehicle comprising the steps of:
   providing a phosphate bath;
   providing magnesium components for the radiator support assembly;
   coating the magnesium components to prevent the magnesium components from contaminating the phosphate bath dipping the coat magnesium componets into the phosphate bath;
   assembling the dipped magnesium components into the radiator support assembly; and
   painting the assembled radiator support assembly.

2. A method as set forth in claim 1 wherein said step of providing comprises providing a radiator support made of a magnesium or magnesium alloy material.

3. A method as set forth in claim 1 wherein said step of coating comprises coating the magnesium components with a phosphate material.

4. A method as set forth in claim 1 wherein said step of coating comprises coating the magnesium components with an anodized magnesium material.

5. A method as set forth in claim 1 including the step of pre-coating the magnesium components.

6. A method as set forth in claim 5 wherein said step of pre-coating comprises coating the magnesium components with a phosphate material.

7. A method as set forth in claim 5 including the step of applying a sealer to the pre-coated magnesium components.

8. A method as set forth in claim 7 wherein said step of applying comprises applying an E-coating to the pre-coated magnesium components.

9. A method as set forth in claim 1 wherein said step of assembling comprises assembling the magnesium components and other non-magnesium components together to form the radiator support assembly.

10. A method as set forth in claim 9 wherein the non-magnesium components include spacers, fasteners, and bridging brackets.

11. A method as set forth in claim 1 wherein said step of painting comprises pain ting the radiator support assembly by dipping the radiator support assembly into a paint material.

12. A method for coating a radiator support assembly for a motor vehicle comprising the steps of:
    providing a phosphate bath;
    providing a magnesium radiator support for the radiator support assembly;
    coating the magnesium radiator support to prevent the magnesium radiator support from contaminating the phosphate bath;
    assembling the magnesium radiator support and other non-magnesium components to form the radiator support assembly, the coating preventing corrosion when the magnesium radiator support is assembled to the non-magnesium components;
    coating the radiator support assembly in the phosphate bath; and
    painting the radiator support assembly.

13. A method as set forth in claim 12 wherein said step of coating comprises coating the magnesium radiator support with a phosphate material.

14. A method as set forth in claim 12 wherein said step of coating comprises coating the magnesium radiator support with an anodized magnesium material.

15. A method as set forth in claim 12 including the step of pre-coating the magnesium radiator support.

16. A method as set forth in claim 15 wherein said step of pre-coating comprises coating the magnesium radiator support with a phosphate material.

17. A method as set forth in claim 16 including the step of applying a sealer to the pre-coated magnesium radiator support.

18. A method as set forth in claim 17 wherein said step of applying comprises applying an E-coating to the pre-coated magnesium radiator support.

19. A method as set forth in claim 12 wherein the non-magnesium components include spacers, fasteners, and bridging brackets.

20. A method for coating a radiator support assembly for a motor vehicle comprising the steps of:
    providing a phosphate bath;
    providing a magnesium radiator support for the radiator support assembly;
    pre-coating the magnesium radiator support with a phosphate material;
    applying a sealer to the pre-coated magnesium radiator support;
    coating the pre-coated magnesium radiator support with sealer thereon to prevent the pre-coated magnesium radiator support with the sealer thereon from contaminating the phosphate bath;
    assembling the coated magnesium radiator support and other non-magnesium components together to form the radiator support assembly;
    coating the radiator support assembly in the phosphate bath; and
    painting the radiator support assembly.

* * * * *